(12) United States Patent
Sato et al.

(10) Patent No.: US 8,911,917 B2
(45) Date of Patent: Dec. 16, 2014

(54) FUEL CELL

(75) Inventors: Masahiko Sato, Utsunomiya (JP);
Yasuhiro Watanabe, Tokyo (JP); Shuji Sato, Utsunomiya (JP); Masaaki Sakano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 451 days.

(21) Appl. No.: 13/298,476

(22) Filed: Nov. 17, 2011

(65) Prior Publication Data
US 2012/0129071 A1 May 24, 2012

(30) Foreign Application Priority Data

Nov. 22, 2010 (JP) ................................. 2010-259630
Oct. 14, 2011 (JP) ................................. 2011-226780

(51) Int. Cl.
*H01M 8/04* (2006.01)
*H01M 2/38* (2006.01)

(52) U.S. Cl.
USPC ........................................ 429/514; 429/457

(58) Field of Classification Search
USPC ........................................ 429/457, 514, 483
See application file for complete search history.

(56) References Cited

U.S. PATENT DOCUMENTS 7,736,785 B2  6/2010 Oda et al.
2008/0292930 A1* 11/2008 Oda et al. ........................ 429/26

FOREIGN PATENT DOCUMENTS

JP    06-140056 A    5/1994
JP    2008-27750 A   2/2008
JP    2008-293758 A  12/2008

OTHER PUBLICATIONS

Japanese Office Action dated Jul. 1, 2014, issued in corresponding Japanese Patent Application No. 2011-226780 with partial English translation (4 pages).

* cited by examiner

*Primary Examiner* — Ula C. Ruddock
*Assistant Examiner* — Thomas H. Parsons
(74) *Attorney, Agent, or Firm* — Westerman, Hattori, Daniels & Adrian, LLP

(57) ABSTRACT

A cell unit of a fuel cell includes a second separator. A first oxygen-containing gas flow field is formed on a surface of the second separator. An inlet buffer is connected to an inlet of the oxygen-containing gas flow field, and an outlet buffer is connected to an outlet of the first oxygen-containing gas flow field. The inlet buffer includes a first inlet buffer area having a deep groove and a second inlet buffer area, and the outlet buffer includes a first outlet buffer area having a deep groove and a second outlet buffer area. The first inlet buffer area and the first outlet buffer area have different surface areas.

6 Claims, 16 Drawing Sheets

FUEL CELL

CROSS-REFERENCE TO RELATED APPLICATION

This application is based upon and claims the benefit of priority from Japanese Patent Applications No. 2010-259630 filed on Nov. 22, 2010 and No. 2011-226780 filed on Oct. 14, 2011, of which the contents are incorporated herein by reference.

BACKGROUND OF THE INVENTION

1. Field of the Invention

The present invention relates to a fuel cell formed by stacking a membrane electrode assembly and a separator in a stacking direction. The membrane electrode assembly includes a pair of electrodes, and an electrolyte membrane interposed between the electrodes. A reactant gas flow field for supplying a reactant gas along an electrode surface is formed in the separator.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a unit of a power generation cell (unit cell). In use, generally, several tens to hundreds of unit cells are stacked together to form a fuel cell stack mounted in a vehicle.

In the fuel cell, so called internal manifolds are often adopted for supplying a fuel gas and an oxygen-containing gas as reactant gases to the anode and the cathode of each of the stacked power generation cells. The internal manifold includes a reactant gas supply passage and a reactant gas discharge passage extending through the power generation cells in the stacking direction. The reactant gas supply passage and the reactant gas discharge passage are connected respectively to an inlet and an outlet of a reactant gas flow field for supplying the reactant gas along an electrode surface.

In this regard, openings of the reactant gas supply passage and the reactant gas discharge passage have relatively small sizes. Therefore, in order to allow the reactant gas to flow smoothly, buffers for distributing the reactant gas are required at positions adjacent to the reactant gas supply passage and the reactant gas discharge passage. For example, a solid oxide fuel cell disclosed in Japanese Laid-Open Patent Publication No. 06-140056 (hereinafter referred to as the conventional technique) includes a separator 1 as shown in FIG. 16.

Supply/discharge holes 2a as passages of one of the reactant gases and supply/discharge holes 2b as passages of the other of the reactant gases are provided respectively at diagonally opposite positions, i.e., at four corners of the separator 1. Ridges and grooves are provided alternately on a surface 1a of the separator 1 to form a reactant gas flow field 3a. Likewise, a reactant gas flow field 3b is formed on a surface 1b of the separator 1.

On the surface 1a, the supply/discharge holes 2a and the reactant gas flow field 3a are connected through gas distribution channels (buffers) 4a, and a plurality of current collectors 5 are provided in the gas distribution channels 4a. On the surface 1b, gas distribution channels 4b connecting the supply/discharge holes 2b and the reactant gas flow field 3b are formed, and a plurality of current collectors 5 are provided in the gas distribution channels 4b.

SUMMARY OF THE INVENTION

In the conventional technique, the diameter in each opening of the supply/discharge holes 2a is significantly small in comparison with the width of the reactant gas flow field 3a (diameter in the direction indicated by the arrow X). Thus, it is not possible to uniformly supply the reactant gas along the width direction of the reactant gas flow field 3a indicated by the arrow X.

In the structure, in some locations in the power generation area of the reactant gas flow field 3a, the flow rate of the reactant gas tends to be small. Thus, when the load is small, power generation cannot be performed stably. When the load is large, concentration overvoltage occurs due to shortage of the reactant gas, and the desired power generation cannot be achieved.

The present invention has been made to solve the problems of this type, and an object of the present invention is to provide a fuel cell having simple structure in which reactant gases can be supplied from reactant gas supply passages to the entire reactant gas flow fields uniformly and reliably through buffers, and the desired power generation performance can be maintained.

The present invention relates to a fuel cell formed by stacking a membrane electrode assembly and a separator in a stacking direction. The membrane electrode assembly includes a pair of electrodes, and an electrolyte membrane interposed between the electrodes. A reactant gas flow field for supplying a reactant gas along an electrode surface is formed in the separator.

A reactant gas supply passage and a reactant gas discharge passage extend through the fuel cell for supplying the reactant gas in the stacking direction. The fuel cell includes an inlet buffer connecting the reactant gas supply passage and the reactant gas flow field and an outlet buffer connecting the reactant gas discharge passage and the reactant gas flow field. The inlet buffer includes a first inlet buffer area adjacent to the reactant gas supply passage and a second inlet buffer area adjacent to the first reactant gas flow field. The outlet buffer includes a first outlet buffer area adjacent to the reactant gas discharge passage and a second outlet buffer area adjacent to the first reactant gas flow field.

The first inlet buffer area is deeper than the second inlet buffer area in the stacking direction, and the first outlet buffer area is deeper than the second outlet buffer area in the stacking direction. The first inlet buffer area and the first outlet buffer area have different surface areas.

In the present invention, the first inlet buffer area adjacent to the reactant gas supply passage is deeper than the second inlet buffer area adjacent to the reactant gas flow field. The first outlet buffer area adjacent to the reactant gas discharge passage is deeper than the second outlet buffer area adjacent to the reactant gas flow field.

In the structure, the reactant gas supplied from the reactant gas supply passage to the first inlet buffer area is distributed from the first inlet buffer area to the second inlet buffer area uniformly, and thereafter, the reactant gas is supplied to the reactant gas flow field. Further, the reactant gas flows from the reactant gas flow field to the first outlet buffer area uniformly through the second outlet buffer area. Then, the reactant gas is discharged into the reactant gas discharge passage.

In effect, the width of the opening of the reactant gas supply passage and the width of the opening of the reactant gas discharge passage are increased in the presence of the first inlet buffer area and the first outlet buffer area having deep grooves, adjacent respectively to the reactant gas supply passage and the reactant gas discharge passage. Therefore, the reactant gas is supplied from the reactant gas supply passage to the entire reactant gas flow field uniformly and reliably through the inlet buffer.

Further, the first inlet buffer area and the first outlet buffer area have different surface areas. In the structure, in the case where the surface area of the first inlet buffer area is smaller than the surface area of the first outlet buffer area, the reactant gas can be supplied uniformly along the width direction of the reactant gas flow field. Thus, it becomes possible to supply the reactant gas to the entire reactant gas flow field uniformly and reliably.

The above and other objects, features and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Figure 1:
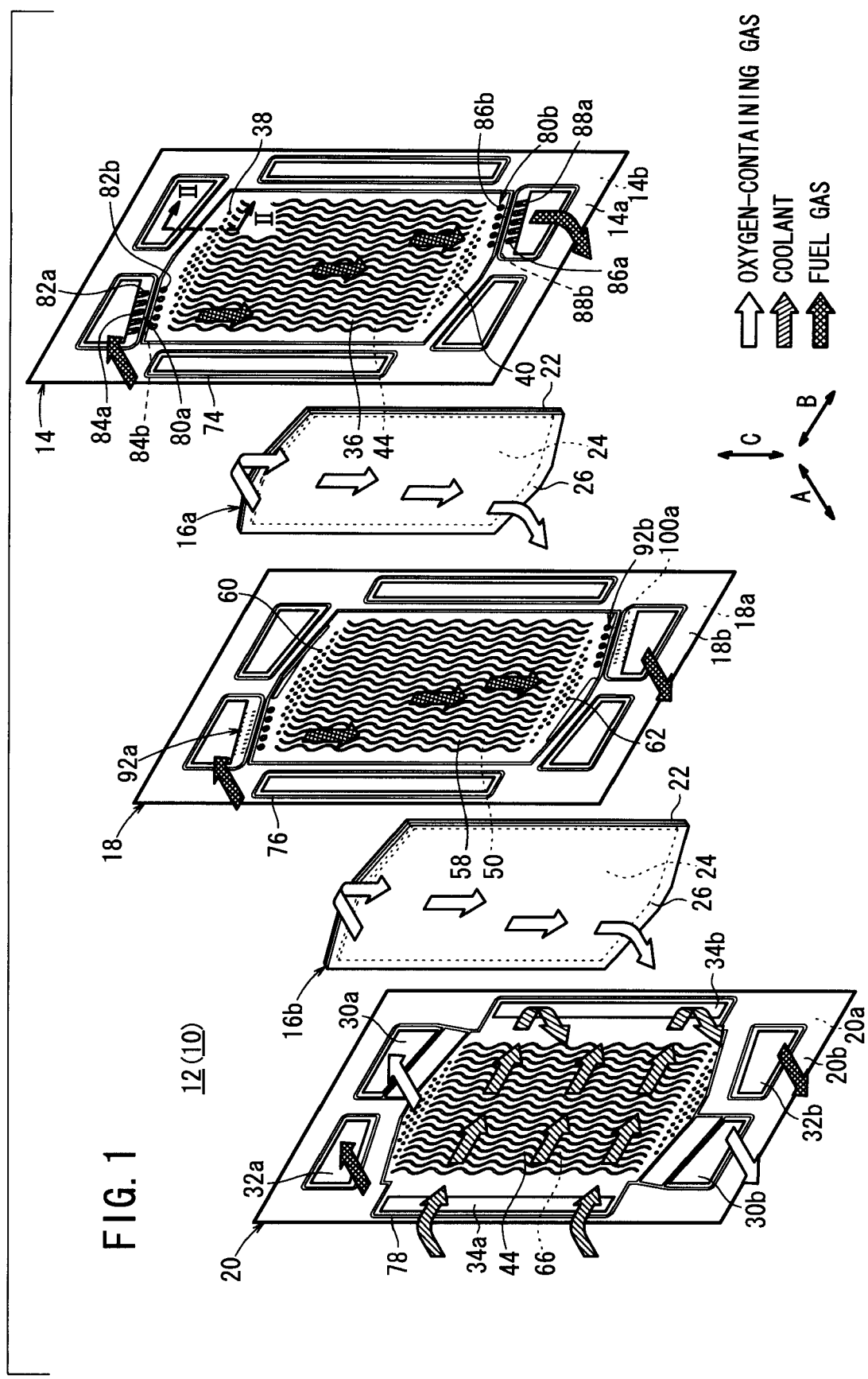
FIG. 1 is an exploded perspective view showing a power generation cell of a fuel cell according to a first embodiment of the preset invention.
Figure 2:
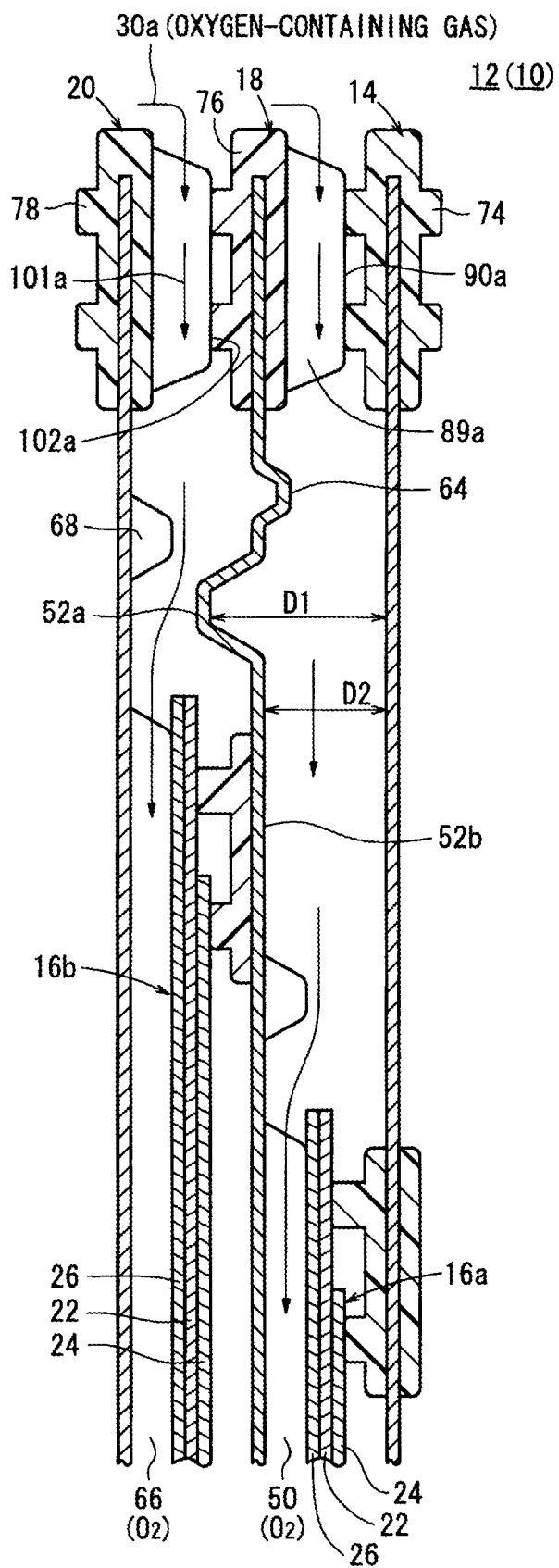
FIG. 2 is a cross sectional view taken along a line II-II in FIG. 1, showing the power generation cell.

As shown in FIGS. 1 and 2, a fuel cell 10 according to a first embodiment of the present invention is formed by stacking a plurality of cell units (power generation cells) 12 in a horizontal direction indicated by an arrow A or in a gravity direction indicated by an arrow C, and used as a fuel cell stack, e.g., mounted in a vehicle.

Each of the cell units 12 includes a first separator 14, a first membrane electrode assembly (MEA) 16a, a second separator 18, a second membrane electrode assembly 16b, and a third separator 20.

For example, the first separator 14, the second separator 18, and the third separator 20 are made of rectangular metal plates such as steel plates, stainless steel plates, aluminum plates, plated steel sheets, or metal plates having anti-corrosive surfaces by surface treatment. Each of the first separator 14, the second separator 18, and the third separator 20 is formed by corrugating a metal thin plate under pressure, and has a corrugated shape in cross section. Instead of using the metal separators, carbon separators may be used as the first separator 14, the second separator 18, and the third separator 20.

For example, each of the first membrane electrode assembly 16a and the second membrane electrode assembly 16b includes an anode 24, a cathode 26, and a solid polymer electrolyte membrane 22 interposed between the anode 24 and the cathode 26. The solid polymer electrolyte membrane 22 is formed by impregnating a thin membrane of perfluorosulfonic acid with water, for example.

The surface area of the anode 24 is smaller than the surface area of the solid polymer electrolyte membrane 22 and the surface area of the cathode 26, which construct a stepped-type MEA. The surface area of the anode 24 and the surface area of the cathode 26 may be the same. Each of the solid polymer electrolyte membrane 22, the anode 24, and the cathode 26 has cutouts at upper and lower positions at both ends in the direction indicated by the arrow B. Thus, the surface areas of the solid polymer electrolyte membrane 22, the anode 24, and the cathode 26 are reduced.

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 24 and the electrode catalyst layer of the cathode 26 are fixed to both surfaces of the solid polymer electrolyte membrane 22, respectively.

At an upper end of the cell unit 12 in the longitudinal direction indicated by the arrow C, an oxygen-containing gas supply (inlet) passage 30a for supplying an oxygen-containing gas such as the air, and a fuel gas supply (inlet) passage 32a for supplying a fuel gas such as a hydrogen-containing gas are provided. The oxygen-containing gas supply passage 30a and the fuel gas supply passage 32a extend through the cell unit 12 in the direction indicated by the arrow A.

At a lower end of the cell unit 12 in the longitudinal direction indicated by the arrow C, a fuel gas discharge (outlet) passage 32b for discharging the fuel gas, and an oxygen-containing gas discharge (outlet) passage 30b for discharging the oxygen-containing gas are provided. The fuel gas discharge passage 32b and the oxygen-containing gas discharge passage 30b extend through the cell unit 12 in the direction indicated by the arrow A.

At one end of the cell unit 12 in the lateral direction indicated by the arrow B, a coolant supply (inlet) passage 34a for supplying a coolant is provided, and at the other end of the cell unit 12 in the lateral direction, a coolant discharge (outlet) passage 34b for discharging the coolant is provided. The coolant supply passage 34a and the coolant discharge passage 34b extend through the cell unit 12 in the direction indicated by the arrow A.

The first separator 14 has a first fuel gas flow field 36 on its surface 14a facing the first membrane electrode assembly 16a. The first fuel gas flow field 36 is connected to the fuel gas supply passage 32a and the fuel gas discharge passage 32b. The first fuel gas flow field 36 includes a plurality of corrugated flow grooves extending in the direction indicated by the arrow C. An inlet buffer 38 and an outlet buffer 40 each having bosses are provided adjacent to the inlet (upper end) and the outlet (lower end) of the first fuel gas flow field 36. The first fuel gas flow field 36 may include a plurality of straight flow grooves extending straight in the direction indicated by the arrow C. A first oxygen-containing gas flow field 50, a second fuel gas flow field 58, a second oxygen-containing gas flow field 66, a fuel gas flow field 138, and an oxygen-containing gas flow field 140 as described later have the same structure in this respect.

The inlet buffer 38 and the outlet buffer 40 have functions of distributing the fuel gas from the fuel gas supply passage 32a to the first fuel gas flow field 36 uniformly in the width direction of the first fuel gas flow field 36 and uniformly merging the fuel gas distributed in the width direction of the first fuel gas flow field 36 into the fuel gas discharge passage 32b. The bosses in the inlet buffer 38 and the outlet buffer 40 may have various shapes such as circular, rectangular shapes, or rod shapes, and are formed on front and back surfaces of the first separator 14. In the second separator 18 and the third separator 20 as described later, buffers have the same structure in this respect.

A coolant flow field 44 is formed on a surface 14b of the first separator 14. The coolant flow field 44 is connected to the coolant supply passage 34a and the coolant discharge passage 34b. The coolant flow field 44 is formed on the back surface of the first fuel gas flow field 36.

Figure 3:
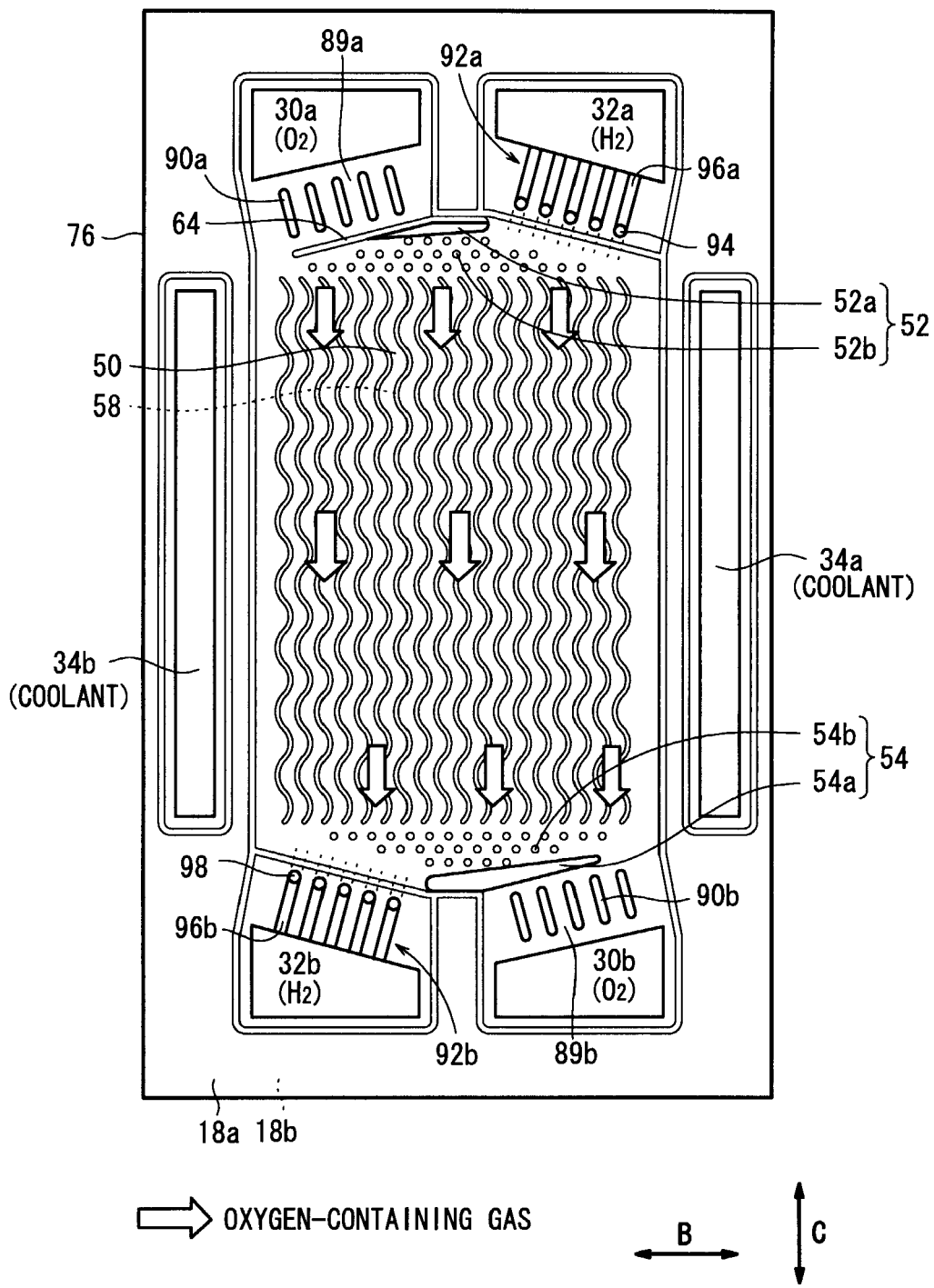
FIG. 3 is a view showing one surface of a second separator of the fuel cell.

As shown in FIG. 3, the second separator 18 has a first oxygen-containing gas flow field 50 on its surface 18a facing the first membrane electrode assembly 16a. The first oxygen-containing gas flow field 50 is connected to the oxygen-containing gas supply passage 30a and the oxygen-containing gas discharge passage 30b. The first oxygen-containing gas flow field 50 includes a plurality of corrugated flow grooves extending in the direction indicated by the arrow C. An inlet buffer 52 and an outlet buffer 54 each having bosses are provided adjacent to the inlet (upper end) and the outlet (lower end) of the first oxygen-containing gas flow field 50.

The inlet buffer 52 includes a substantially triangular first inlet buffer area 52a adjacent to the oxygen-containing gas supply passage 30a and a second inlet buffer area 52b adjacent to the first oxygen-containing gas flow field 50. As shown in FIG. 2, as viewed from the first oxygen-containing gas flow field 50, the depth D1 of the first inlet buffer area 52a in the stacking direction is larger than the depth D2 of the second inlet buffer area 52b in the stacking direction.

The outlet buffer 54 has the same structure as the inlet buffer 52. As shown in FIG. 3, the outlet buffer 54 includes a substantially triangular first outlet buffer area 54a adjacent to the oxygen-containing gas discharge passage 30b and a second outlet buffer area 54b adjacent to the first oxygen-containing gas flow field 50. The groove of the first outlet buffer area 54a is deeper than the groove of the second outlet buffer area 54b in the stacking direction.

The first inlet buffer area 52a is provided in a relatively narrow area at a substantially central position in the width direction of the first oxygen-containing gas flow field 50 indicated by the arrow B. The first inlet buffer area 52a includes a groove having a narrowed end (hereinafter referred to as the narrowed groove) adjacent to the oxygen-containing gas supply passage 30a, extending up to a substantially central position of a portion connecting the oxygen-containing gas supply passage 30a and the first oxygen-containing gas flow field 50. Further, the first inlet buffer area 52a includes a groove extending in the direction indicated by the arrow B, at a substantially central position in the width direction of the first oxygen-containing gas flow field 50. This groove and the narrowed groove are combined together to form a laterally elongated groove having a small width in the direction indicated by the arrow C.

The first outlet buffer area 54a is provided in a relatively wide area extending from an end to a substantially central position in the width direction of the first oxygen-containing gas flow field 50. The first outlet buffer area 54a includes a narrowed groove adjacent to the oxygen-containing gas discharge passage 30b, extending from one end to the other end of a portion connecting the oxygen-containing gas discharge passage 30b and the first oxygen-containing gas flow field 50. Further, the first outlet buffer area 54a includes a groove extending in the direction indicated by the arrow B, at a substantially central position in the width direction of the first oxygen-containing gas flow field 50. This groove and the narrowed groove are combined together to form a laterally elongated groove which is wider than the laterally elongated groove of the first inlet buffer area 52a in the direction indicated by the arrow C, and longer than the laterally elongated groove of the first inlet buffer area 52a in the direction indicated by the arrow B.

That is, the first inlet buffer area 52a and the first outlet buffer area 54a have different surface areas. Specifically, the surface area of the first inlet buffer area 52a is smaller than the surface area of the first outlet buffer area 54a. The groove of the first inlet buffer area 52a and the groove of the first outlet buffer area 54a have the same depth.

Figure 4:
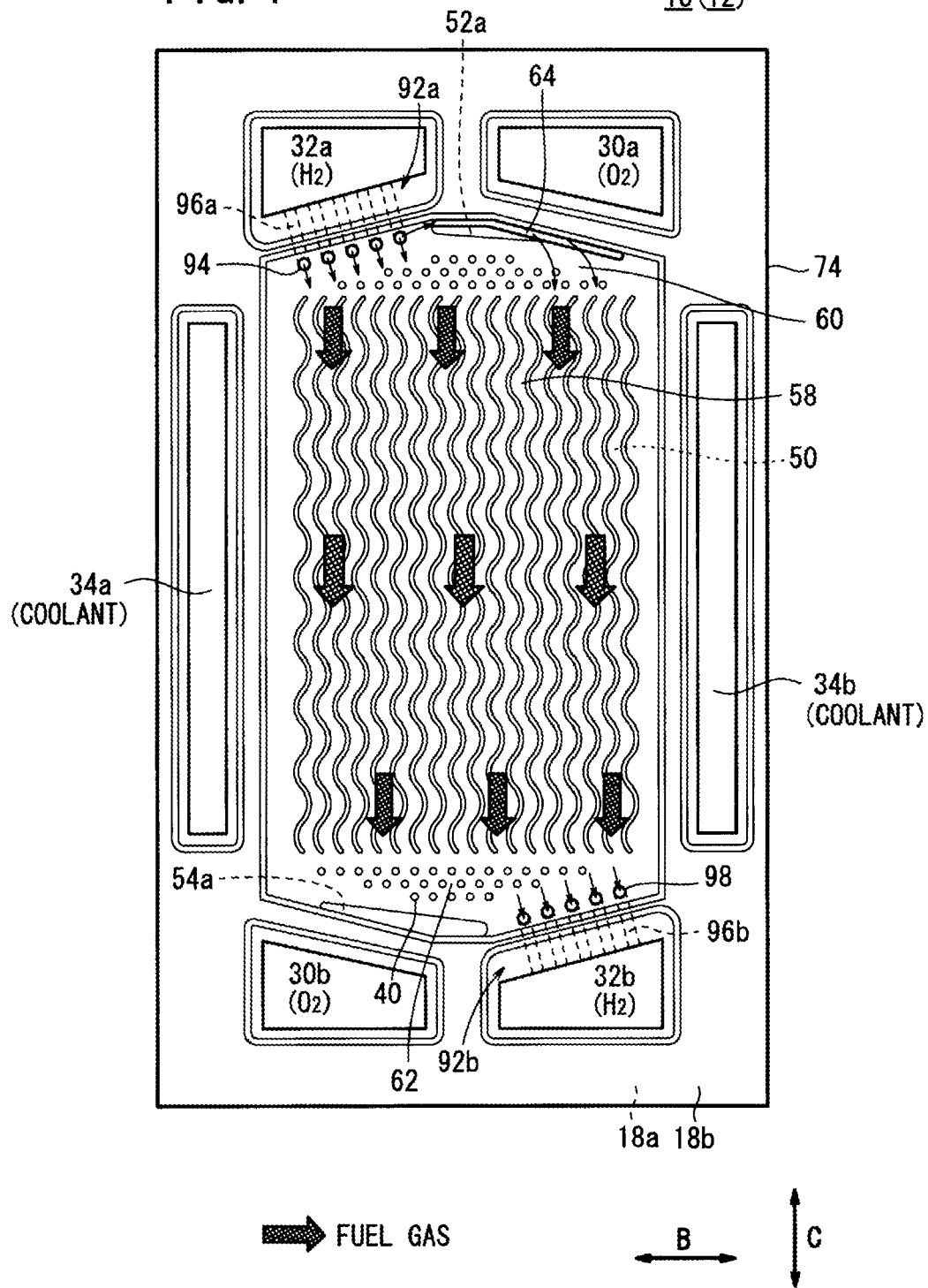
FIG. 4 is a view showing the other surface of the second separator.

As shown in FIG. 4, the second separator 18 has a second fuel gas flow field 58 on its surface 18b facing the second membrane electrode assembly 16b. The second fuel gas flow field 58 is connected to the fuel gas supply passage 32a and the fuel gas discharge passage 32b. The second fuel gas flow field 58 includes a plurality of corrugated flow grooves extending in the direction indicated by the arrow C. An inlet buffer 60 and an outlet buffer 62 each having bosses are provided adjacent to the inlet (upper end) and the outlet (lower end) of the second fuel gas flow field 58. The bosses project on one surface and a back surface alternately.

A bypass channel 64 is provided outside the inlet buffer 60 at a position where ridges on the back surface of the first inlet buffer area 52a are not provided. The bypass channel 64 is a groove which is deeper than the grooves of the inlet buffer 60. The bypass channel 64 is provided in a relatively wide area extending from a substantially central position in the width direction of the second fuel gas flow field 58 to an end of the oxygen-containing gas supply passage 30a. The bypass channel 64 and the inlet buffer 60 may have the same depth.

Figure 5:
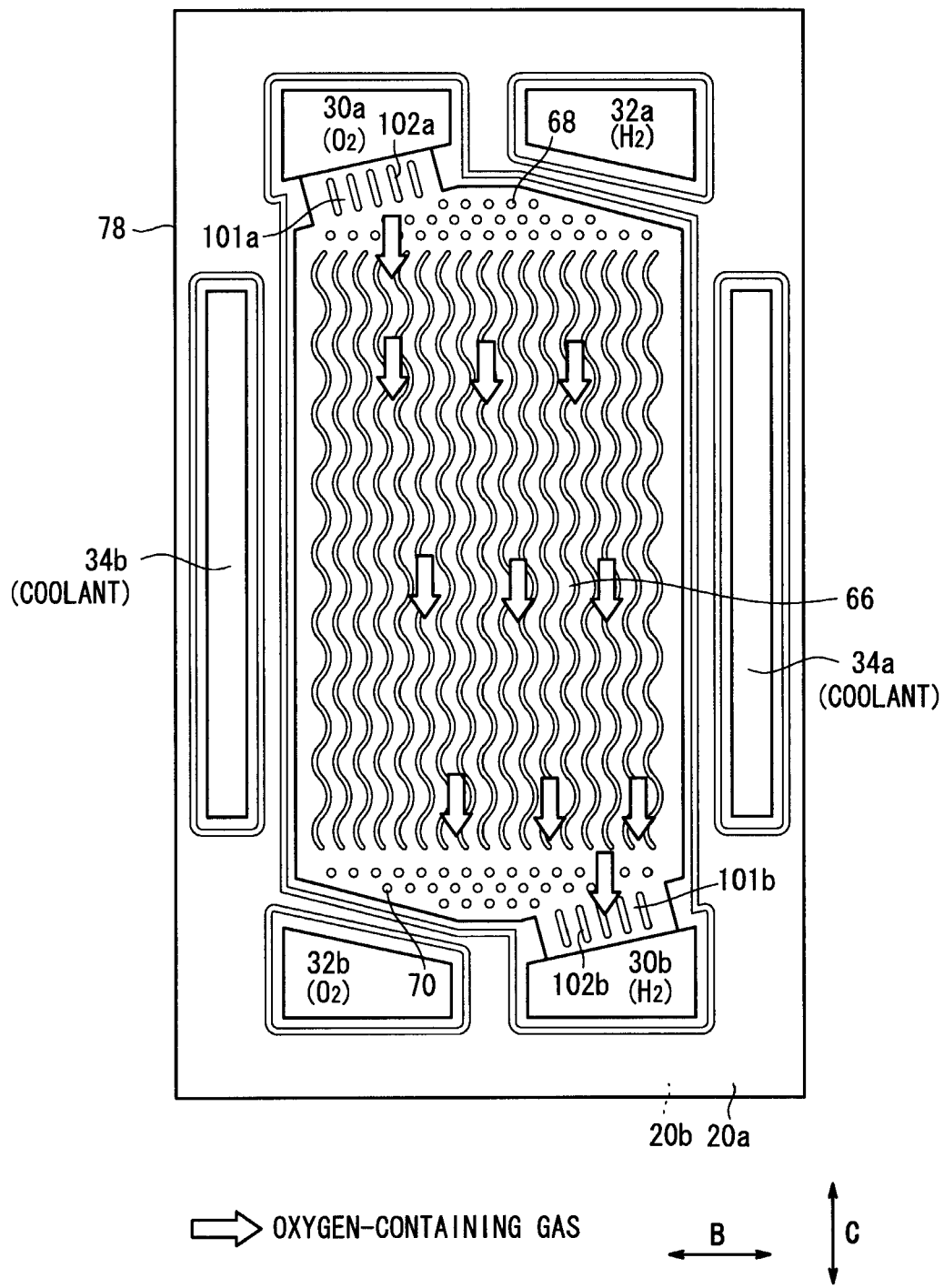
FIG. 5 is a front view showing a third separator of the fuel cell.

As shown in FIG. 5, the third separator 20 has the second oxygen-containing gas flow field 66 on its surface 20a facing the second membrane electrode assembly 16b. The second oxygen-containing gas flow field 66 is connected to the oxygen-containing gas supply passage 30a and the oxygen-containing gas discharge passage 30b.

The second oxygen-containing gas flow field 66 includes a plurality of corrugated flow grooves extending in the direction indicated by the arrow C. An inlet buffer 68 and an outlet buffer 70 each having bosses are provided adjacent to the inlet (upper end) and the outlet (lower end) of the second oxygen-containing gas flow field 66.

As shown in FIG. 1, the coolant flow field 44 connected to the coolant supply passage 34a and the coolant discharge passage 34b is formed on a surface 20b of the third separator 20. The coolant flow field 44 is formed by overlapping the corrugated surfaces on the backs of the first fuel gas flow field 36 and the second oxygen-containing gas flow field 66.

A first seal member 74 is formed integrally on the surfaces 14a, 14b of the first separator 14, around the outer end of the first separator 14. A second seal member 76 is formed integrally on the surfaces 18a, 18b of the second separator 18, around the outer end of the second separator 18. A third seal member 78 is formed integrally on the surfaces 20a, 20b of the third separator 20, around the outer end of the third separator 20.

For example, the first to third seal members 74, 76, and 78 are made of seal material, cushion material or packing material such as EPDM (Ethylene Propylene Diene Monomer), NBR (Nitrile Butadiene Rubber), fluoro rubber, silicone rubber, fluoro silicone rubber, butyl rubber, natural rubber, styrene rubber, chloroprene rubber, or acrylic rubber.

As shown in FIG. 1, the first separator 14 has a first inlet connection channel 80a connecting the fuel gas supply passage 32a and the first fuel gas flow field 36, and a first outlet connection channel 80b connecting the fuel gas discharge passage 32b and the first fuel gas flow field 36. The first inlet connection channel 80a includes a plurality of outer supply holes 82a and a plurality of inner supply holes 82b.

A plurality of grooves 84a connecting the fuel gas supply passage 32a and the outer supply holes 82a are provided on the surface 14a of the first separator 14. A plurality of grooves 84b connecting the outer supply holes 82a and the inner supply holes 82b are formed on the surface 14b of the first separator 14. Likewise, the first outlet connection channel 80b includes a plurality of outer discharge holes 86a and a plurality of inner discharge holes 86b.

A plurality of grooves 88a connecting the fuel gas discharge passage 32b and the outer discharge holes 86a are formed on the surface 14a of the first separator 14. A plurality of grooves 88b connecting the outer discharge holes 86a and the inner discharge holes 86b are formed on the surface 14b of the first separator 14.

As shown in FIG. 3, a plurality of projecting receivers 90a, 90b forming grooves of an inlet connection channel 89a and grooves of an outlet connection channel 89b are provided at portions connecting the oxygen-containing gas supply passage 30a and the first oxygen-containing gas flow field 50, and the oxygen-containing gas discharge passage 30b and the first oxygen-containing gas flow field 50.

The second separator 18 has a second inlet connection channel 92a connecting the fuel gas supply passage 32a and the second fuel gas flow field 58, and a second outlet connection channel 92b connecting the fuel gas discharge passage 32b and the second fuel gas flow field 58. The second inlet connection channel 92a has supply holes 94. Grooves 96a connecting the fuel gas supply passage 32a and the supply holes 94 are formed on the surface 18a of the second separator 18.

Likewise, the second outlet connection channel 92b includes a plurality of discharge holes 98. A plurality of grooves 96b connecting the discharge holes 98 to the fuel gas discharge passage 32b are formed on the surface 18a of the second separator 18.

As shown in FIG. 5, in the third separator 20, a plurality of projecting receivers 102a, 102b forming grooves of an inlet connection channel 101a and grooves of an outlet connection channel 101b are provided at portions connecting the oxygen-containing gas supply passage 30a and the second oxygen-containing gas flow field 66, and the oxygen-containing gas discharge passage 30b and the second oxygen-containing gas flow field 66.

Next, operation of the fuel cell 10 will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol, or oil is supplied to the coolant supply passage 34a.

Thus, the oxygen-containing gas flows from the oxygen-containing gas supply passage 30a into the first oxygen-containing gas flow field 50 of the second separator 18 and the second oxygen-containing gas flow field 66 of the third separator 20 (see FIGS. 3 and 5). The oxygen-containing gas moves along the first oxygen-containing gas flow field 50 in the direction of gravity indicated by the arrow C, and the oxygen-containing gas is supplied to the cathode 26 of the first membrane electrode assembly 16a. Further, the oxygen-containing gas moves along the second oxygen-containing gas flow field 66 in the direction indicated by the arrow C, and the oxygen-containing gas is supplied to the cathode 26 of the second membrane electrode assembly 16b (see FIG. 1).

As shown in FIGS. 1 and 4, the fuel gas flows from the fuel gas supply passage 32a into the grooves 84a, 96a formed between the first separator 14 and the second separator 18. The fuel gas supplied into the grooves 84a flows through the outer supply holes 82a, and moves toward the surface 14b of the first separator 14. Further, the fuel gas flows through the grooves 84b, and moves from the inner supply holes 82b toward the surface 14a.

Thus, the fuel gas flows toward the inlet buffer 38. Then, the fuel gas flows along the first fuel gas flow field 36, and moves in the direction of gravity indicated by the arrow C. The fuel gas is supplied to the anode 24 of the first membrane electrode assembly 16a.

Further, after the fuel gas flows into the grooves 96a, as shown in FIG. 4, the fuel gas moves through the supply holes 94, and moves toward the surface 18b of the second separator 18. Thus, after the fuel gas is supplied to the inlet buffer 60 on the surface 18b, the fuel gas moves along the second fuel gas flow field 58 in the direction indicated by the arrow C, and the fuel gas is supplied to the anode 24 of the second membrane electrode assembly 16b (see FIGS. 1 and 4).

Thus, in each of the first membrane electrode assembly 16a and the second membrane electrode assembly 16b, the oxygen-containing gas supplied to the cathode 26 and the fuel gas supplied to the anode 24 are partially consumed in electrochemical reactions at catalyst layers of the cathode 26 and the anode 24 for generating electricity.

Then, the oxygen-containing gas partially consumed at the cathode 26 of each of the first and second membrane electrode assemblies 16a, 16b flows along the oxygen-containing gas discharge passage 30b, and the oxygen-containing gas is discharged in the direction indicated by the arrow A.

The fuel gas partially consumed at the anode 24 of the first membrane electrode assembly 16a flows from the outlet buffer 40 through the inner discharge holes 86b, as shown in FIG. 1, and the fuel gas is discharged toward the surface 14b of the first separator 14.

The fuel gas discharged to the surface 14b flows into the outer discharge holes 86a, and again moves toward the surface 14a of the first separator 14. Thus, the fuel gas flows from the outer discharge holes 86a through the grooves 88a, and the fuel gas is discharged into the fuel gas discharge passage 32b.

Further, the fuel gas partially consumed at the anode 24 of the second membrane electrode assembly 16b flows from the outlet buffer 62 through the discharge holes 98 toward the surface 18a of the second separator 18. As shown in FIG. 4, the fuel gas is discharged into the fuel gas discharge passage 32b through the grooves 96b.

As shown in FIG. 1, the coolant supplied to the coolant supply passage 34a flows into the coolant flow field 44 formed between the first separator 14 and the third separator 20, and flows in the direction indicated by the arrow B. Thus, after the coolant cools the first and second membrane electrode assemblies 16a, 16b, the coolant is discharged into the coolant discharge passage 34b.

In the first embodiment, as shown in FIG. 3, the inlet buffer 52 of the second separator 18 includes the first inlet buffer area 52a adjacent to the oxygen-containing gas supply passage 30a and the second inlet buffer area 52b adjacent to the first oxygen-containing gas flow field 50. The first inlet buffer area 52a is deeper than the second inlet buffer area 52b in the stacking direction.

The outlet buffer 54 includes the first outlet buffer area 54a adjacent to the oxygen-containing gas discharge passage 30b and the second outlet buffer area 54b adjacent to the first oxygen-containing gas flow field 50. The first outlet buffer area 54a is deeper than the second outlet buffer area 54b in the stacking direction.

In the structure, the oxygen-containing gas supplied from the oxygen-containing gas supply passage 30a to the first inlet buffer area 52a is distributed uniformly from this first inlet buffer area 52a to the entire second inlet buffer area 52b. Therefore, after the oxygen-containing gas is supplied from the first inlet buffer area 52a to the second inlet buffer area 52b uniformly, the oxygen-containing gas is supplied to the entire width direction of the first oxygen-containing gas flow field 50 indicated by the arrow B uniformly and reliably.

Further, the oxygen-containing gas from the first oxygen-containing gas flow field 50 flows through the second outlet buffer area 54b, and the oxygen-containing gas is distributed to the first outlet buffer area 54a uniformly. Thereafter, the oxygen-containing gas is discharged into the oxygen-containing gas discharge passage 30b. Therefore, in the first oxygen-containing gas flow field 50, the oxygen-containing gas is distributed uniformly over the entire power generation area.

Further, the first inlet buffer area 52a and the first outlet buffer area 54a have different surfaces areas. In the first embodiment, the surface area of the first inlet buffer area 52a is smaller than the surface area of the first outlet buffer area 54a. In the structure, as shown in FIG. 4, the bypass channel 64 as the groove which is deeper than the inlet buffer 60 can be formed easily in the second fuel gas flow field 58 of the second separator 18, on the back surface of the first oxygen-containing gas flow field 50, outside the inlet buffer 60 connecting the fuel gas supply passage 32a and the second fuel gas flow field 58.

Thus, the fuel gas can be supplied to the entire width direction of the second fuel gas flow field 58 indicated by the arrow B uniformly and reliably. Specifically, a first comparative example where the first inlet buffer area 52a having the same surface area (relatively large surface area) as the first outlet buffer area 54a is adopted and no bypass channel 64 is provided in the inlet buffer 60 of the second fuel gas flow field 58, and the first embodiment were used to detect the flow rate of the fuel gas in the width direction of the second fuel gas flow field 58.

Figure 6:
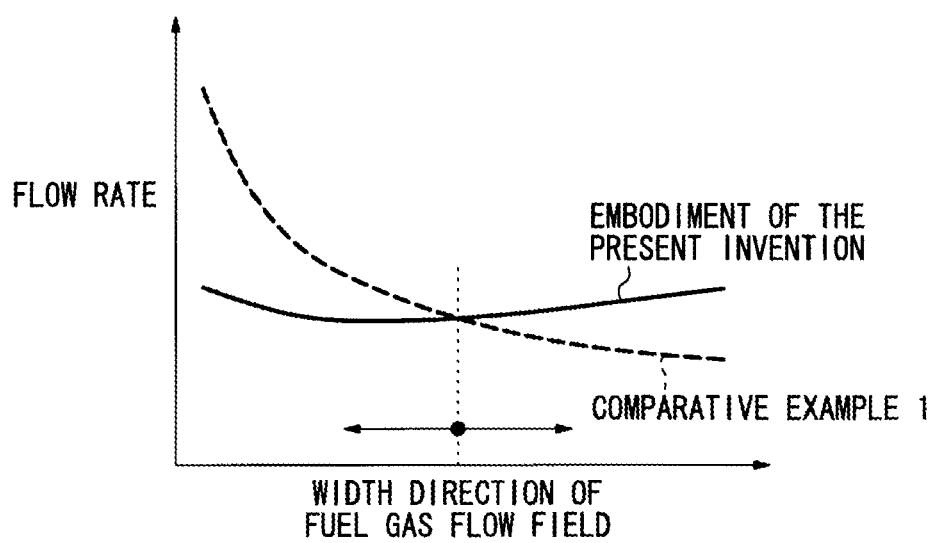
FIG. 6 is a graph showing the relationship between the flow rate of and the position in the width direction of a fuel gas flow field in each of a first comparative example and the first embodiment.

The result is shown in FIG. 6. In the second fuel gas flow field 58, hydrogen in the fuel gas is partially consumed at the anode 24. Therefore, the difference between the flow rate at the inlet and the flow rate at the outlet is large, and the pressure loss in the inlet buffer 60 is large. In the comparative example 1, the flow rate becomes large as it gets closer to the fuel gas supply passage 32a.

In contrast, in the first embodiment, the first inlet buffer area 52a is provided in a relatively narrow area. The ridges on the back surface of the first inlet buffer area 52a are provided in a relatively small space in the inlet buffer 60 of the second fuel gas flow field 58. Therefore, the buffer area of the inlet buffer 60 is increased, and improvement in the flow rate distribution of the fuel gas is achieved by the decrease in the pressure loss.

Further, in the first embodiment, the bypass channel 64 is formed outside the inlet buffer 60 at a position where the back surface of the first inlet buffer area 52a is not provided. The groove of the bypass channel 64 is deeper than the grooves of the inlet buffer 60. In the second fuel gas flow field 58, the bypass channel 64 is provided in a relatively wide area extending from the center in the width direction of the second fuel gas flow field 58 to the end adjacent to the oxygen-containing gas supply passage 30a.

In the structure, the fuel gas can be supplied sufficiently to the area adjacent to the oxygen-containing gas supply passage 30a where, in general (in the case of not adopting the structure of the present invention) the fuel gas cannot be supplied smoothly. Further, it becomes possible to supply the fuel gas to the entire area in the width direction of the second fuel gas flow field 58 uniformly and reliably (see FIG. 6).

Further, in the first embodiment, as shown in FIG. 3, in the first oxygen-containing gas flow field 50, the surface area of the first inlet buffer area 52a is smaller than the surface area of the first outlet buffer area 54a. In the structure, the oxygen-containing gas can be supplied over the width direction of the first oxygen-containing gas flow field 50 uniformly.

Figure 7:
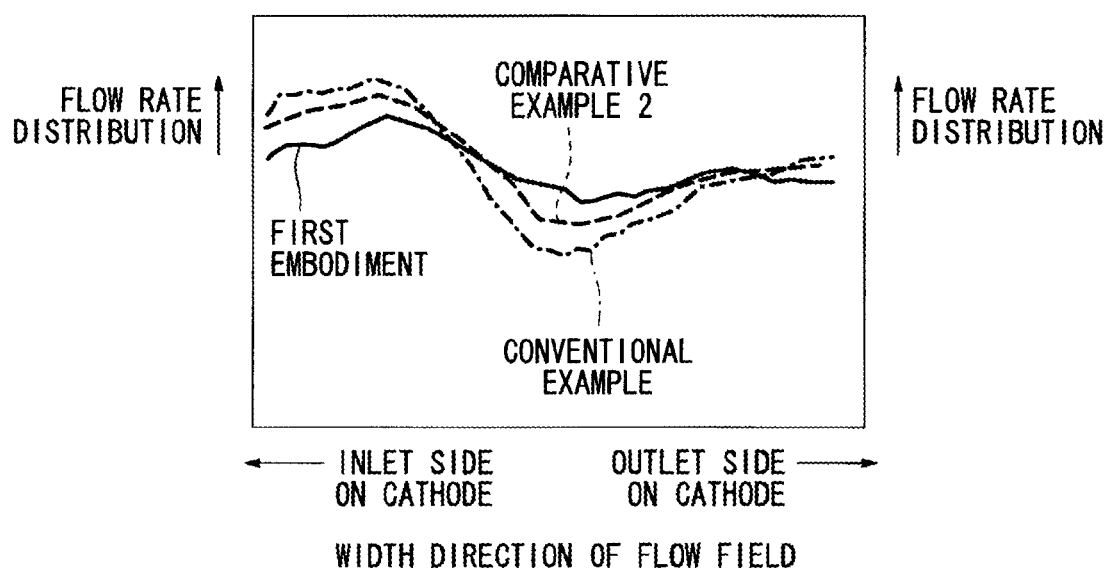
FIG. 7 is a graph showing comparison of flow rate distribution in the first embodiment, a conventional example, and a second comparative example.

Specifically, as shown in FIG. 7, the first embodiment, a second comparative example where the first inlet buffer area 52a and the first outlet buffer area 54a have the same surface area, and a conventional example where the first inlet buffer area 52a and the first outlet buffer area 54a are not provided, were used for comparison of the flow rate distribution in the width direction of the flow field in these cases. As a result, the first embodiment had the best performance of distributing the oxygen-containing gas along the width direction of the first oxygen-containing gas flow field 50. The second comparative example had the second best performance, and the conventional example had the worst performance.

That is, in the first embodiment, since the surface area of the first outlet buffer area 54a is larger than the surface area of the first inlet buffer area 52a, the pressure loss is small, and the oxygen-containing gas flows smoothly through the central position in the width direction of the first oxygen-containing gas flow field 50. Thus, it becomes possible to distribute the oxygen-containing gas over the entire width direction of the first oxygen-containing gas flow field 50 uniformly.

Figure 8:
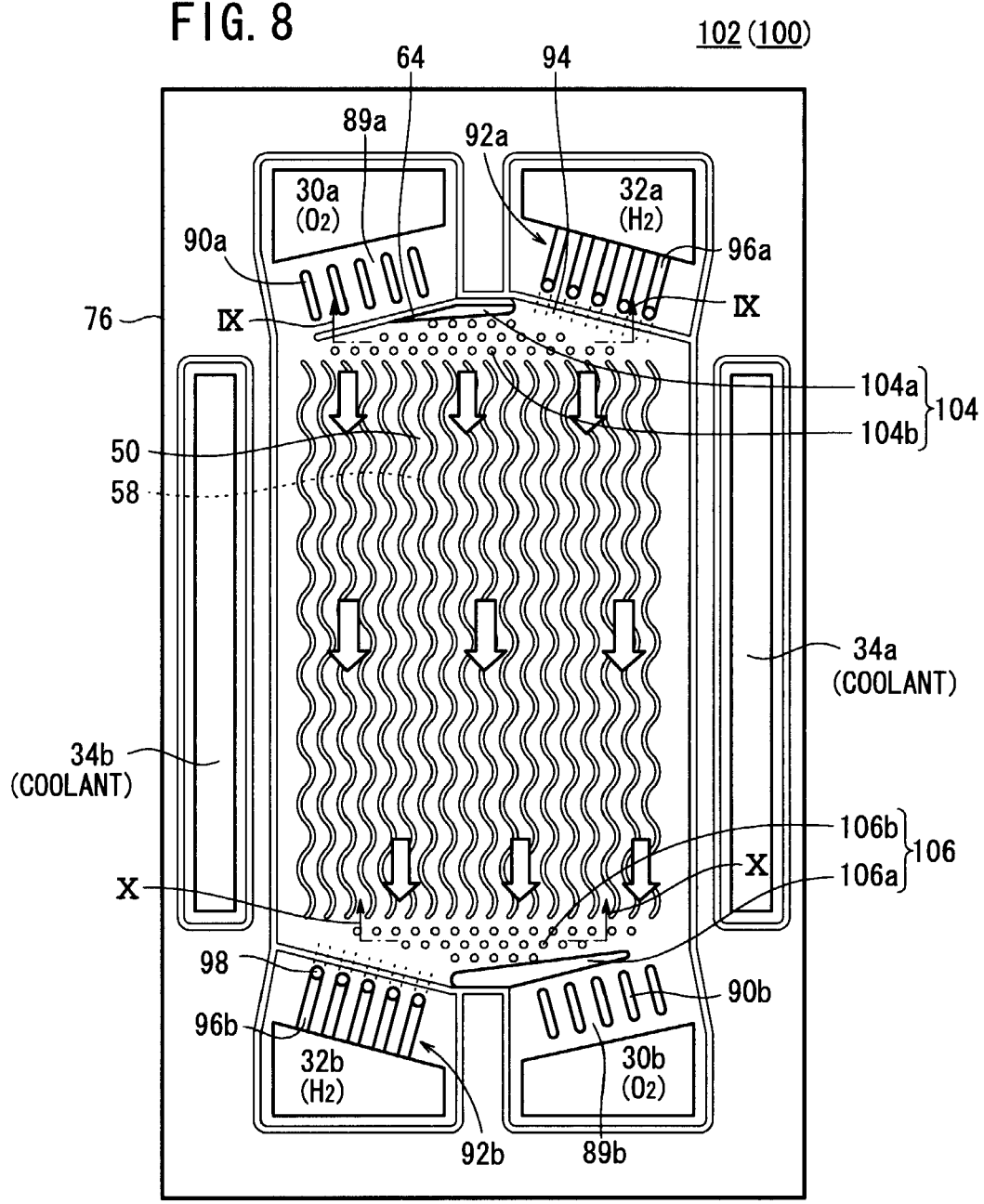
FIG. 8 is a view showing one surface of a second separator of a fuel cell according to a second embodiment of the present invention.

FIG. 8 is a view showing one surface of a second separator 102 of a fuel cell 100 according to a second embodiment of the present invention.

The constituent elements that are identical to those of the fuel cell 10 according to the first embodiment are labeled with the same reference numerals, and description thereof will be omitted. Likewise, in third and other embodiments described later, the constituent elements that are identical to those of the fuel cell 10 according to the first embodiment are labeled with the same reference numerals, and description thereof will be omitted.

The second separator 102 includes an inlet buffer 104 and an outlet buffer 106 each having bosses adjacent to the inlet (upper end) and the outlet (lower end) of the first oxygen-containing gas flow field 50.

The inlet buffer 104 includes a substantially triangular first inlet buffer area 104a adjacent to the oxygen-containing gas supply passage 30a and a second inlet buffer area 104b adjacent to the first oxygen-containing gas flow field 50. The first inlet buffer area 104a is deeper than the second inlet buffer area 104b in the stacking direction.

Figure 9:
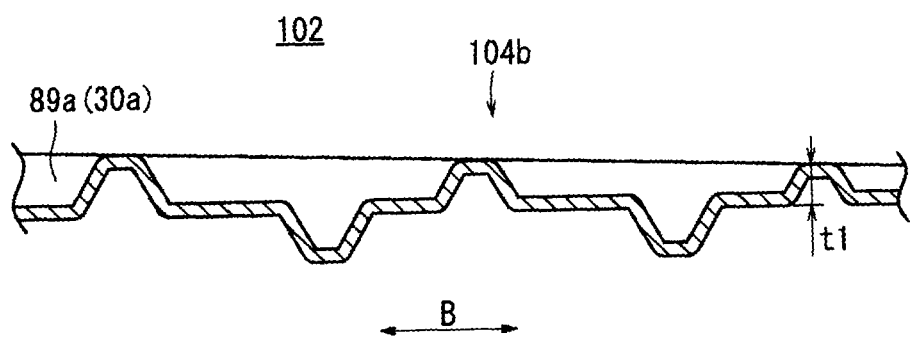
FIG. 9 is a cross sectional view taken along a line IX-IX in FIG. 8, showing the second separator.

As shown in FIG. 9, the second inlet buffer area 104b extends in the width direction of the first oxygen-containing gas flow field 50 indicated by the arrow B, and the depth t1 of the second inlet buffer area 104b is decreased as it gets remoter from the oxygen-containing gas supply passage 30a (inlet connection channel 89a).

The outlet buffer 106 has the same structure as the inlet buffer 104. The outlet buffer 106 includes a substantially triangular first outlet buffer area 106a adjacent to the oxygen-containing gas discharge passage 30b and a second outlet buffer area 106b adjacent to the first oxygen-containing gas flow field 50. The first outlet buffer area 106a is deeper than the second outlet buffer area 106b in the stacking direction.

Figure 10:
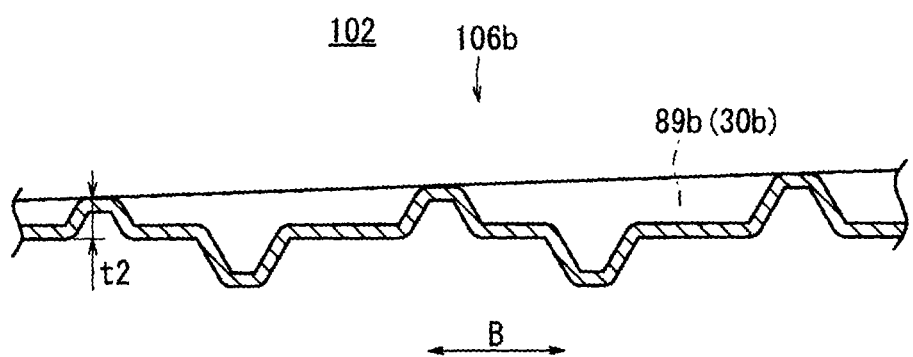
FIG. 10 is a cross sectional view taken along a line X-X in FIG. 8, showing the second separator.

As shown in FIG. 10, the depth t2 of the second outlet buffer area 106b is decreased as it gets remoter from the oxygen-containing gas discharge passage 30b (outlet connection channel 89b) in the direction indicated by the arrow B, i.e., as it gets remoter from the oxygen-containing gas discharge passage 30b in the width direction of the first oxygen-containing gas flow field 50.

In the second embodiment, the depth t1 of the second inlet buffer area 104b is decreased as it gets remoter from the oxygen-containing gas supply passage 30a (inlet connection channel 89a) in the direction indicated by the arrow B. Thus, the oxygen-containing gas can flow more smoothly as it gets remoter from the oxygen-containing gas supply passage 30a, in the direction in which, in general (in the case of not adopting the structure of the present invention), the oxygen-containing gas flows less smoothly. Therefore, the oxygen-containing gas is distributed smoothly over the entire second inlet buffer area 104b.

The depth t2 of the second outlet buffer area 106b is decreased as it gets remoter from the oxygen-containing gas discharge passage 30b (outlet connection channel 89b) in the direction indicated by the arrow B. In the structure, the groove of the second outlet buffer area 106b becomes deep as it gets closer to the oxygen-containing gas discharge passage 30b, and the oxygen-containing gas can flow more smoothly to the oxygen-containing gas discharge passage 30b from the portion where the oxygen-containing gas does not flow smoothly in general.

In the structure, the oxygen-containing gas is distributed over the entire width direction of the first oxygen-containing gas flow field further smoothly and uniformly.

Figure 11:
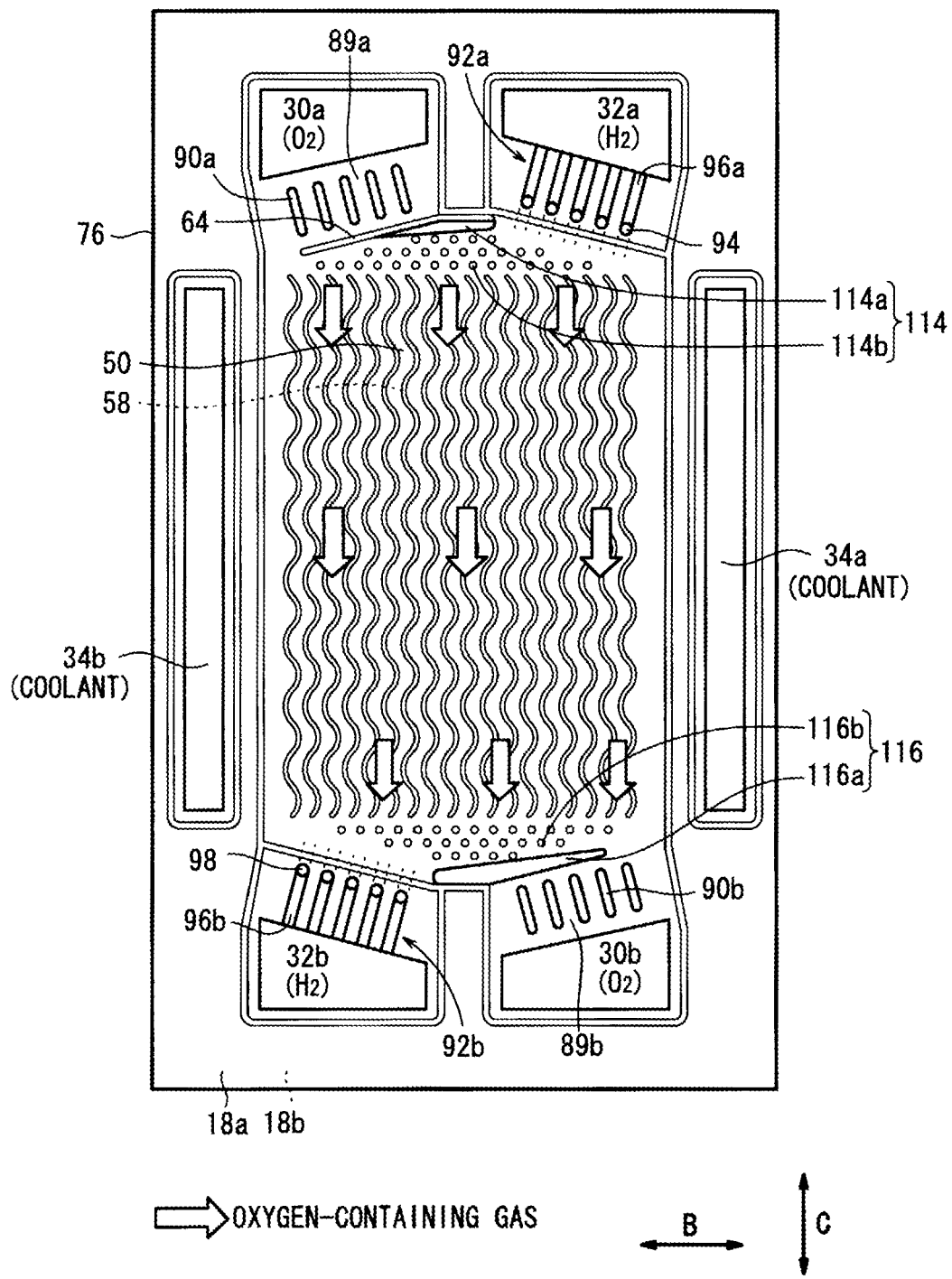
FIG. 11 is a view showing one surface of a second separator of a fuel cell according to a third embodiment of the present invention.

FIG. 11 is a view showing one surface of a second separator 112 of a fuel cell 110 according to a third embodiment of the present invention.

The second separator 112 includes an inlet buffer 114 and an outlet buffer 116 each having bosses adjacent to the inlet (upper end) and the outlet (lower end) of the first oxygen-containing gas flow field 50.

The inlet buffer 114 includes a substantially triangular first inlet buffer area 114a adjacent to the oxygen-containing gas supply passage 30a and a second inlet buffer area 114b adjacent to the first oxygen-containing gas flow field 50. The first inlet buffer area 114a is deeper than the second inlet buffer area 114b in the stacking direction.

The outlet buffer 116 has the same structure as the inlet buffer 114. The outlet buffer 116 includes a substantially triangular first outlet buffer area 116a adjacent to the oxygen-containing gas discharge passage 30b and a second outlet buffer area 116b adjacent to the first oxygen-containing gas flow field 50. The first outlet buffer area 116a is deeper than the second outlet buffer area 116b in the stacking direction.

Figure 12:
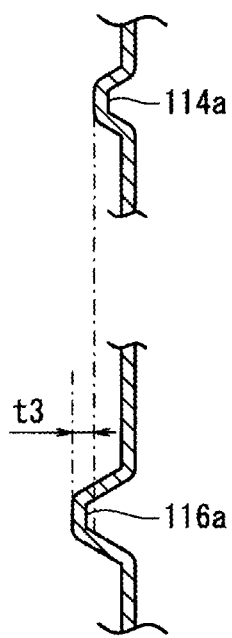
FIG. 12 is a cross sectional view showing main components of the second separator.

As shown in FIG. 12, the groove of the first outlet buffer area 116a is deeper than the groove of the first inlet buffer area 114a by a dimension t3. In the second fuel gas flow field 58 formed on the back surface of the first oxygen-containing gas flow field 50, the fuel gas is partially consumed, and a small amount of the fuel gas flows on the downstream side. Therefore, even if the buffer for the fuel gas has a small size, the performance of discharging the fuel gas is not lowered. Therefore, the buffer for the oxygen-containing gas can have a large size, for discharging a relatively large amount of the oxygen-containing gas.

In the third embodiment, the surface area of the first outlet buffer area 116a is large, and also the groove of the first outlet buffer area 116a is deep, in comparison with the first inlet buffer area 114a. In the structure, the oxygen-containing gas can flow further smoothly along the first oxygen-containing gas flow field 50.

Figure 13:
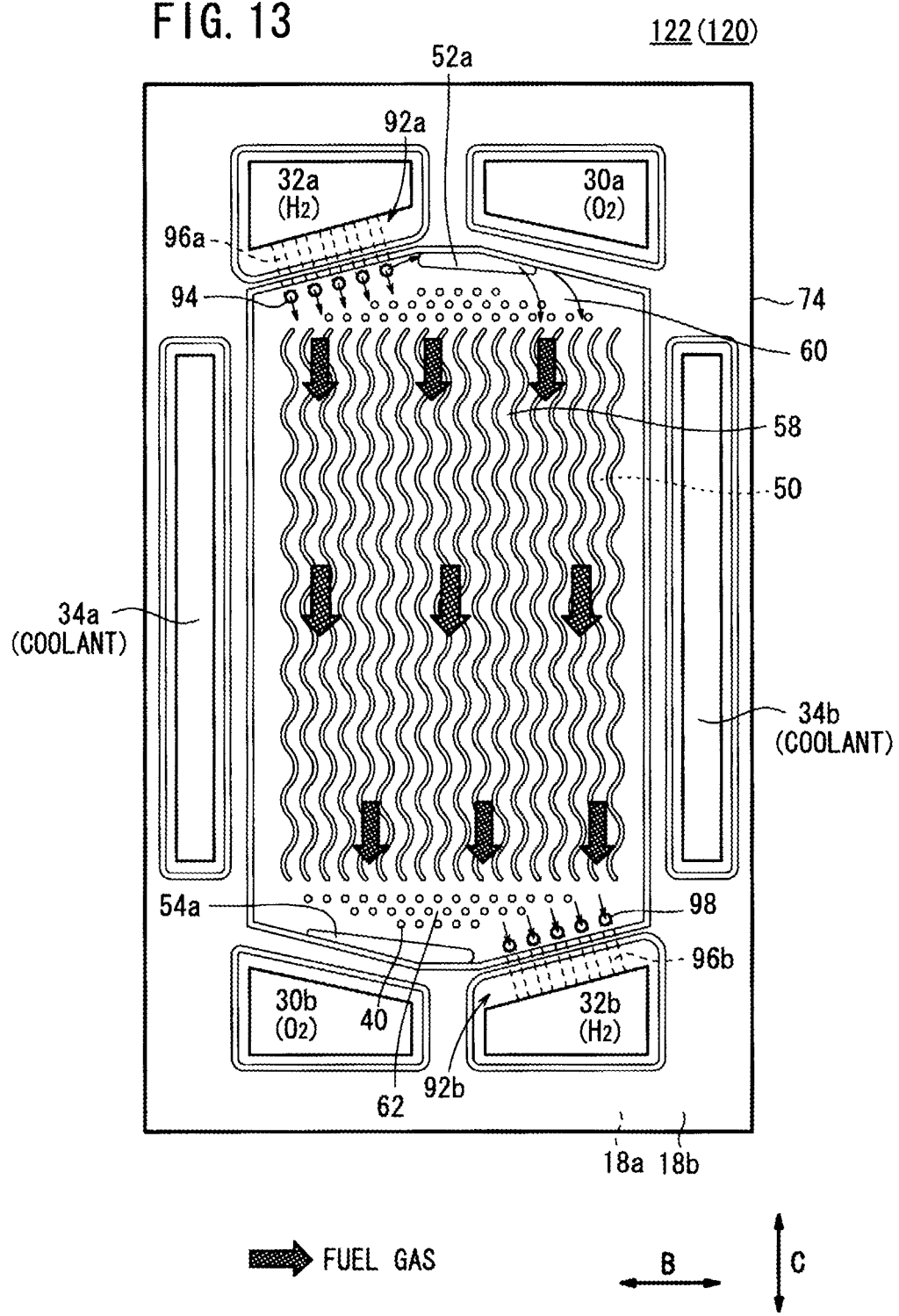
FIG. 13 is a view showing a surface of a second fuel gas flow field of a second separator according to a fourth embodiment of the present invention.

FIG. 13 is a view showing a surface of the second fuel gas flow field 58 of a second separator 122 of a fuel cell 120 according to a fourth embodiment of the present invention.

In the second separator 122, the bypass channel 64 which is a deep groove is not provided outside the inlet buffer 60. In the fuel cell 120, the same advantages as in the case of the first embodiment are obtained. For example, the oxygen-containing gas can be distributed uniformly over the entire power generation area in the first oxygen-containing gas flow field 50.

Figure 14:
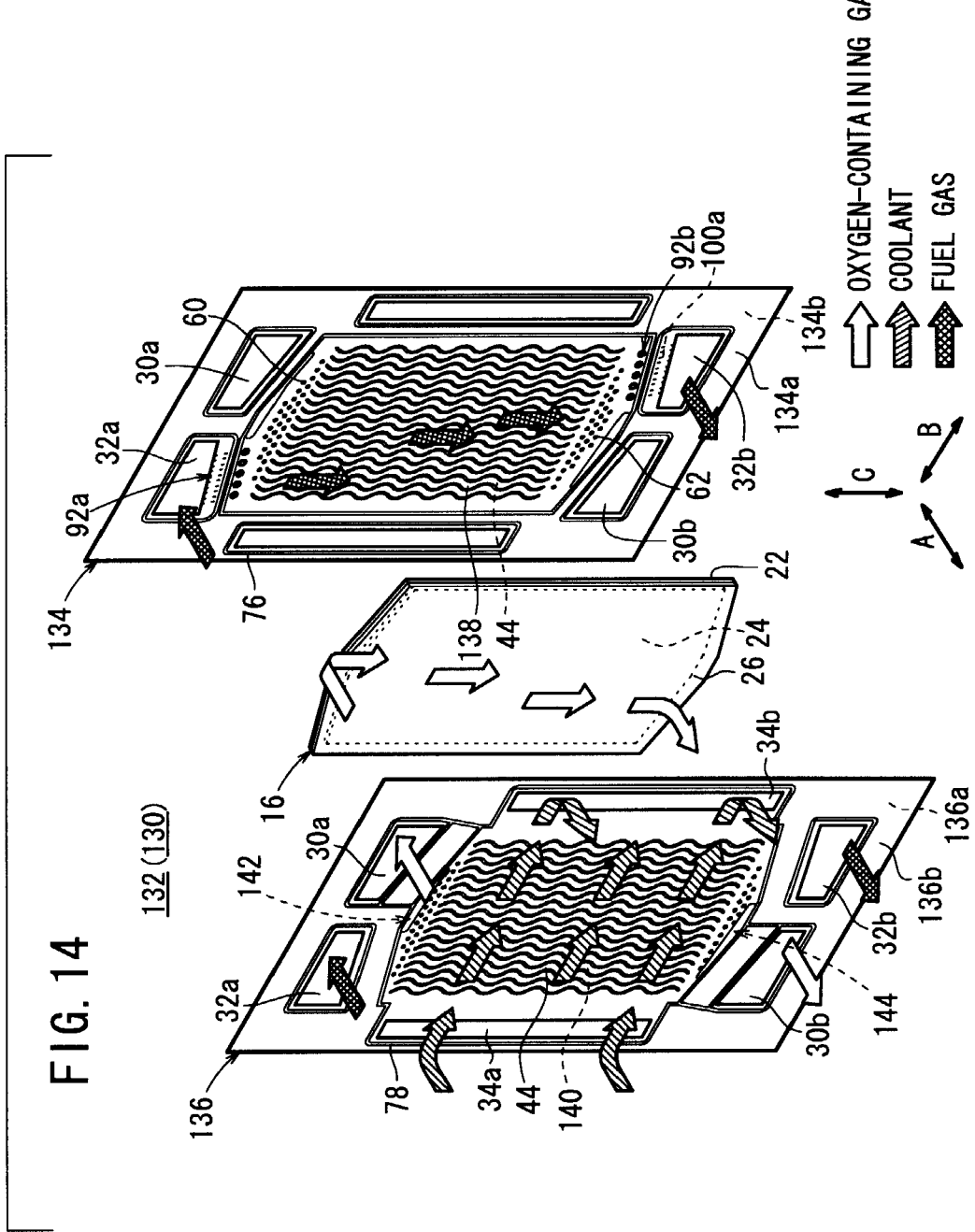
FIG. 14 is an exploded perspective view showing a power generation cell of a fuel cell according to a fifth embodiment to of the present invention.

FIG. 14 is an exploded perspective view showing a power generation cell 132 of a fuel cell 130 according to a fifth embodiment of the present invention.

The power generation cell 132 is formed by sandwiching a membrane electrode assembly 16 between a first separator 134 and a second separator 136. For example, metal separators or carbon separators may be used as the first separator 134 and the second separator 136.

The first separator 134 has a fuel gas flow field 138 on its surface 134a facing the membrane electrode assembly 16. The fuel gas flow field 138 is connected to the fuel gas supply passage 32a and the fuel gas discharge passage 32b. The fuel gas flow field 138 includes a plurality of corrugated (or straight) flow grooves extending in the direction indicated by the arrow C.

Figure 15:
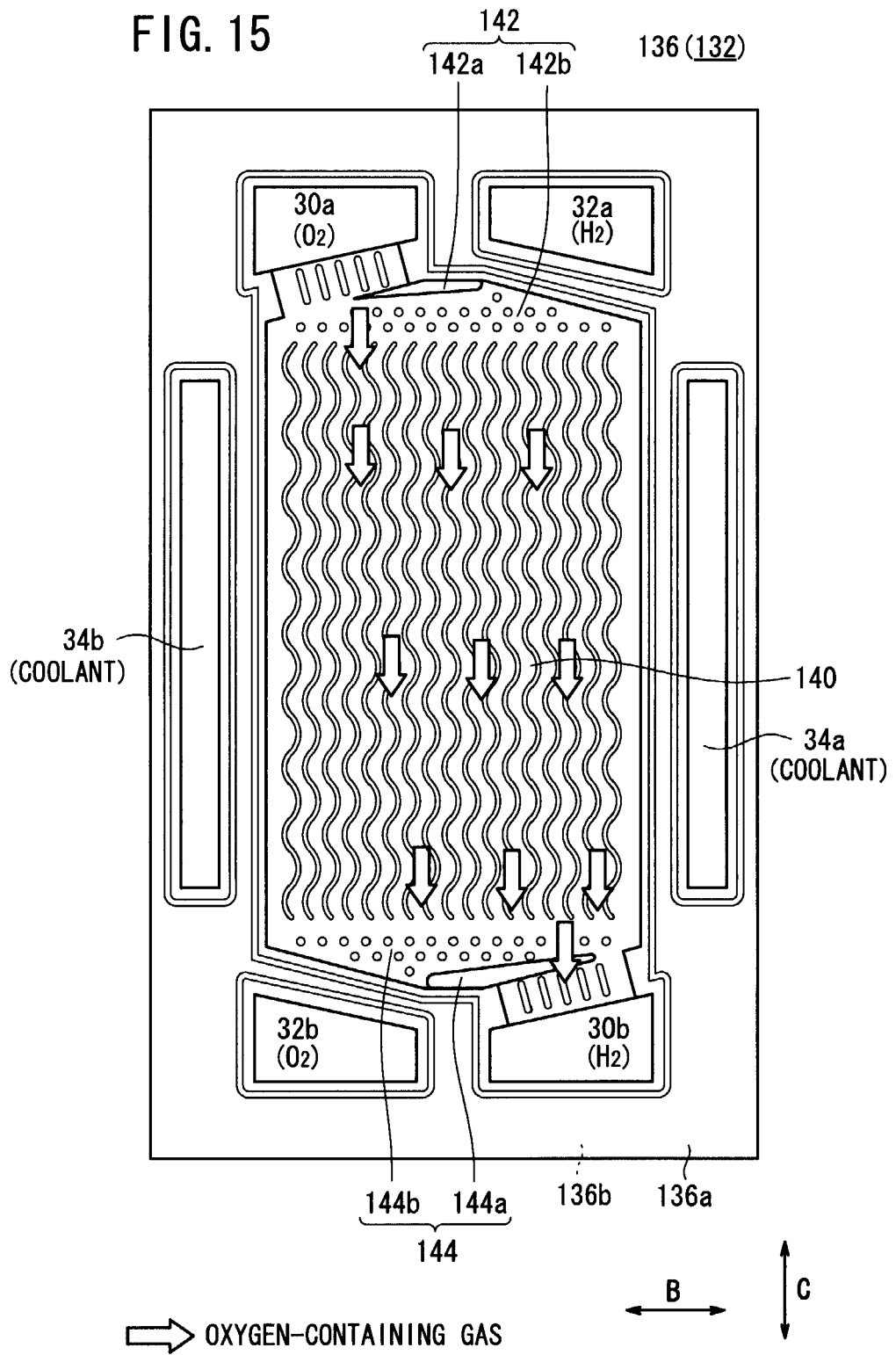
FIG. 15 is a front view showing a second separator of the power generation cell.
Figure 16:
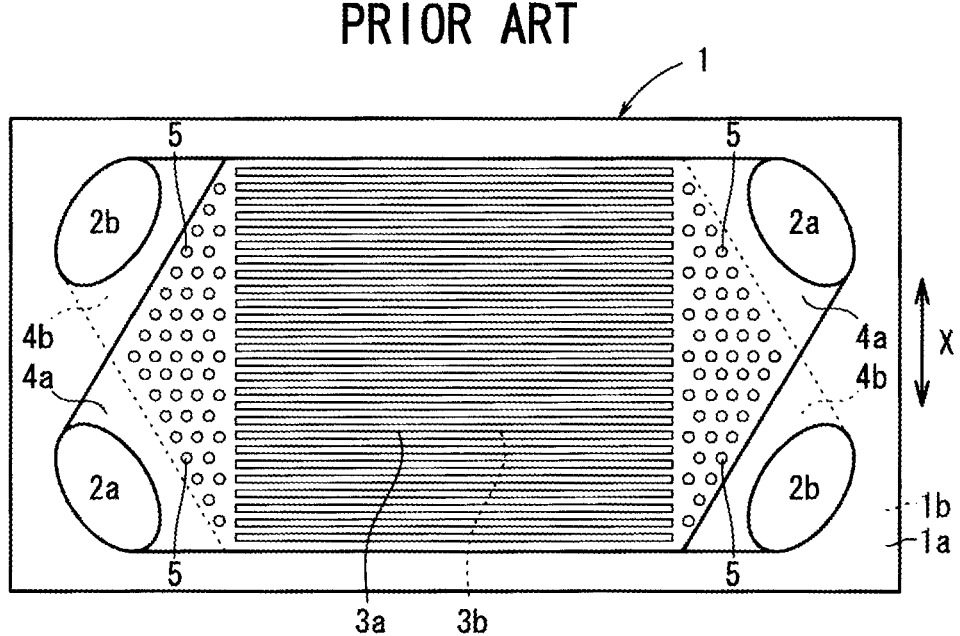
FIG. 16 is a view showing a conventional fuel cell.

As shown in FIG. 15, the second separator 136 has an oxygen-containing gas flow field 140 on its surface 136a facing the membrane electrode assembly 16. The oxygen-containing gas flow field 140 is connected to the oxygen-containing gas supply passage 30a and the oxygen-containing gas discharge passage 30b. The oxygen-containing gas flow field 140 includes a plurality of corrugated (or straight) flow grooves extending in the direction indicated by the arrow C. An inlet buffer 142 and an outlet buffer 144 each having bosses are provided adjacent to the inlet (upper end) and the outlet (lower end) of the oxygen-containing gas flow field 140.

The inlet buffer 142 includes a substantially triangular first inlet buffer area 142a adjacent to the oxygen-containing gas supply passage 30a and a second inlet buffer area 142b adjacent to the oxygen-containing gas flow field 140. As viewed from the oxygen-containing gas flow field 140, the first inlet buffer area 142a is deeper than the second inlet buffer area 142b in the stacking direction.

The outlet buffer 144 has the same structure as the inlet buffer 142. The outlet buffer 144 includes a substantially triangular first outlet buffer area 144a adjacent to the oxygen-containing gas discharge passage 30b and a second outlet buffer area 144b adjacent to the oxygen-containing gas flow field 140. The first outlet buffer area 144a is deeper than the second outlet buffer area 144b in the stacking direction.

The first inlet buffer area 142a is formed in a relatively narrow area at a substantially central position in the width direction of the oxygen-containing gas flow field 140 indicated by the arrow B. The first inlet buffer area 142a includes a groove having a narrowed end adjacent to the oxygen-containing gas supply passage 30a, extending up to a substantially central position of a portion connecting the oxygen-containing gas supply passage 30a and the oxygen-containing gas flow field 140. Further, the first inlet buffer area 142a includes a groove extending in the direction indicated by the arrow B, at a substantially central position in the width direction of the oxygen-containing gas flow field 140. This groove and the narrowed groove are combined together to from a laterally elongated groove having a small width in the direction indicated by the arrow C.

The first outlet buffer area 144a is provided in a relatively wide area extending from an end to a substantially central position in the width direction of the oxygen-containing gas flow field 140. The first outlet buffer area 144a includes a narrowed groove adjacent to the oxygen-containing gas discharge passage 30b, extending from one end to the other end of a portion connecting the oxygen-containing gas discharge passage 30b and the oxygen-containing gas flow field 140. Further, the first outlet buffer area 144a includes a groove extending in the direction indicated by the arrow B, at a substantially central position in the width direction of the oxygen-containing gas flow field 140. This groove and the narrowed groove are combined together to form a laterally elongated groove which is wider than the laterally elongated groove of the first inlet buffer area 142a in the direction indicated by the arrow C, and longer than the laterally elongated groove of the first inlet buffer area 142a in the direction indicated by the arrow B.

That is, the first inlet buffer area 142a and the first outlet buffer area 144a have different surface areas. Specifically, the surface area of the first inlet buffer area 142a is smaller than the surface area of the first outlet buffer area 144a. The groove of the first inlet buffer area 142a and the groove of the first outlet buffer area 144a have the same depth.

As shown in FIG. 14, in each of the power generation cells 132, a coolant flow field 44 is formed between a surface 134b of the first separator 134 and a surface 136b of the adjacent second separator 136. The coolant flow field 44 is connected to the coolant supply passage 34a and the coolant discharge passage 34b.

In the fifth embodiment, as shown in FIG. 15, the inlet buffer 142 and the outlet buffer 144 each having bosses are provided adjacent to the inlet and the outlet of the oxygen-containing gas flow field 140, respectively. The surface area of the first inlet buffer area 142a of the inlet buffer 142 is smaller than the surface area of the first outlet buffer area 144a of the outlet buffer 144.

In the structure, the same advantages as in the case of the first embodiment are obtained. For example, the oxygen-containing gas can be supplied uniformly over the width direction of the oxygen-containing gas flow field 140.

While the invention has been particularly shown and described with reference to preferred embodiments, it will be understood that variations and modifications can be effected thereto by those skilled in the art without departing from the essence and gist of the invention as defined by the appended claims.

What is claimed is:

1. A fuel cell formed by stacking a membrane electrode assembly and a separator in a stacking direction, the membrane electrode assembly including a pair of electrodes, and an electrolyte membrane interposed between the electrodes, a reactant gas flow field for supplying a reactant gas along an electrode surface being formed in the separator, a reactant gas supply passage and a reactant gas discharge passage extending through the fuel cell for supplying the reactant gas in the stacking direction, the fuel cell comprising:
    an inlet buffer connecting the reactant gas supply passage and the reactant gas flow field and an outlet buffer connecting the reactant gas discharge passage and the reactant gas flow field,
    wherein the inlet buffer includes a first inlet buffer area adjacent to the reactant gas supply passage and a second inlet buffer area adjacent to the reactant gas flow field;
    the outlet buffer includes a first outlet buffer area adjacent to the reactant gas discharge passage and a second outlet buffer area adjacent to the reactant gas flow field;
    the first inlet buffer area is deeper than the second inlet buffer area in the stacking direction, and the first outlet buffer area is deeper than the second outlet buffer area in the stacking direction; and
    the first inlet buffer area and the first outlet buffer area have different surface areas.

2. The fuel cell according to claim 1, wherein the surface area of the first inlet buffer area is smaller than the surface area of the first outlet buffer area.

3. The fuel cell according to claim 1, wherein the inlet buffer extends in a width direction of the reactant gas flow field, and a depth of the inlet buffer is decreased in the width direction, away from the reactant gas supply passage; and
    a depth of the outlet buffer is decreased in the width direction, away from the reactant gas discharge passage.

4. The fuel cell according to claim 1, the first outlet buffer area includes a groove which is deeper than a groove of the first inlet buffer area.

5. The fuel cell according to claim 1, wherein a first reactant gas flow field for supplying one of reactant gases along one electrode surface is formed on one surface of the separator, and a second reactant gas flow field for supplying another of the reactant gases along another electrode surface is formed on another surface of the separator;
    the first reactant gas flow field is an oxygen-containing gas flow field, and the second reactant gas flow field is a fuel gas flow field; and
    the one of the reactant gases is an oxygen-containing gas, and the other of the reactant gases is a fuel gas.

6. The fuel cell according to claim 5, comprising a fuel gas inlet buffer connecting the fuel gas flow field and a fuel gas supply passage for allowing a fuel gas to flow in the stacking direction; and
    a fuel gas bypass channel is formed outside the fuel gas inlet buffer, at a position where a back surface of the first inlet buffer area adjacent to the first reactant gas flow field is not formed, and the fuel gas bypass channel has a groove which is deeper than, or which has the same depth as a groove of the fuel gas inlet buffer.

* * * * *